(12) United States Patent
Orru'

(10) Patent No.: US 6,450,794 B1
(45) Date of Patent: Sep. 17, 2002

(54) AUXILIARY INJECTION UNIT FOR A MOULD FOR FORMING PLASTICS ARTICLES HAVING AT LEAST TWO COMPONENTS

(75) Inventor: Enrico G. Orru', Monte Carlo (MC)

(73) Assignee: Plabber Holdings S.A. (LU)

( * ) Notice: Subject to any disclaimer, the term of this patent is extended or adjusted under 35 U.S.C. 154(b) by 0 days.

(21) Appl. No.: 09/787,331
(22) PCT Filed: Mar. 16, 2001
(86) PCT No.: PCT/IB99/00484
§ 371 (c)(1),
(2), (4) Date: May 17, 2001
(87) PCT Pub. No.: WO00/16956
PCT Pub. Date: Mar. 30, 2000

(30) Foreign Application Priority Data

Sep. 18, 1998 (CH) ................................ 1910/98

(51) Int. Cl.⁷ .............................................. B29C 45/16
(52) U.S. Cl. ................ 425/130; 264/328.8; 425/192 R; 425/567
(58) Field of Search ................................. 425/130, 557, 425/558, 559, 561, 192 R, 567; 264/328.11, 572, 255, 328.8

(56) References Cited

U.S. PATENT DOCUMENTS 4,029,454 A * 6/1977 Monnet ...................... 425/130
5,863,487 A * 1/1999 Guergov ..................... 425/130

FOREIGN PATENT DOCUMENTS

| EP | 0794046 | * | 9/1997 |
| JP | 06087138 | * | 3/1994 |
| JP | 7-227875 | * | 8/1995 |
| JP | 07227875 | * | 8/1995 |

* cited by examiner

Primary Examiner—Tim Heitbrink
(74) Attorney, Agent, or Firm—Sughrue Mion, PLLC

(57) ABSTRACT

The subject of the present application is an auxiliary injection unit (1) for fitting to a first mould (9) for injection moulding a first component of plastics material articles, having at least one connection (3) in one side for the injection of a second component.

6 Claims, 3 Drawing Sheets

AUXILIARY INJECTION UNIT FOR A MOULD FOR FORMING PLASTICS ARTICLES HAVING AT LEAST TWO COMPONENTS

The present invention relates to an auxiliary unit for plastics injection moulds for forming plastics articles having at least two components.

Currently it is known to produce moulded plastics articles having at least two components with different characteristics by the following method: initially one component, usually the main component having a predominant volume or weight, is formed in a pre-arranged main mould into which the one component is injected by means of plastics injection moulding machines.

On one side of the same mould there is moreover provided a connection by which an auxiliary injection unit for the separate injection of a second component can be positioned.

Currently it is known to couple the auxiliary injection unit to the main mould by means of a fixed coupling, that is by means of the use of pre-arranged fixing devices such as screws and bolts.

This arrangement has disadvantages in that the maintenance and/or replacement of the auxiliary unit involves rather long operating times and the necessity of using skilled personnel.

As a partial solution to avoid this disadvantage it is known to fit to the auxiliary unit a support which has a magnetic base allowing it to be associated with the mould.

This arrangement also, however, has disadvantages in that it involves additional production costs; moreover the positioning of the auxiliary unit must ensure its perfect alignment in correspondence with the connection on the main mould so as to allow optimum flow of material from the auxiliary unit to the mould; the achievement of this condition is not easy, requiring significant precision upon coupling of the auxiliary unit.

The main object of the present intention is therefore that of resolving the technical problem indicated by eliminating the disadvantages of the prior art and devising an auxiliary unit which can be easily and rapidly fitted to a main mould.

Within the scope of the above-explained object a further important object is that of providing an auxiliary unit in which the interconnection to the main mould also allows the achievement of a correct positioning for the injection of the second component of plastics material into the main mould without requiring the installer to exercise any precision in performing the coupling operation.

Another important object is that of providing an auxiliary unit which is easily removable for maintenance and/or replacement.

Not the least object is that of providing an auxiliary unit which is structurally simple whilst at the same time having low production costs.

The above-listed objects and functions, as well as others which will become more clearly apparent hereinafter, are achieved by an auxiliary injection unit for fitting to one side of a mould for forming articles of plastics material and including at least one connection for the injection of a further plastics material component, which is characterised in that the said unit has at one end a plate which can be fitted slidably to a slide formed in the said at least one connection.

Further characteristics and advantages will become apparent from the detailed description of a particular, but not exclusive, embodiment, illustrated by way of non-limitative example in the attached drawings, in which:

DETAILED DESCRIPTION OF THE INVENTION

Figure 1:
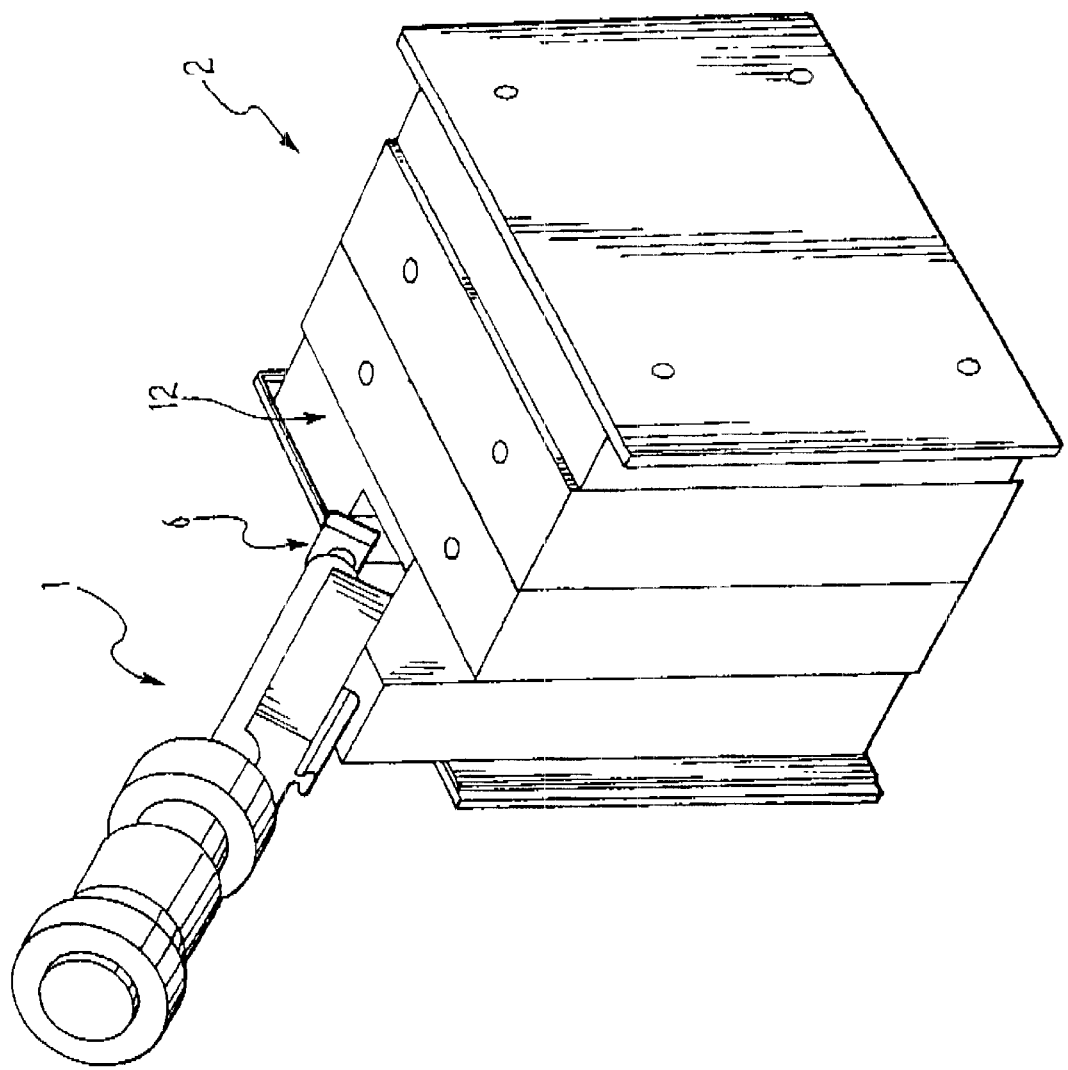
FIG. 1 illustrates, in a three-quarter side view, an auxiliary unit associated with a main mould.
Figure 2:
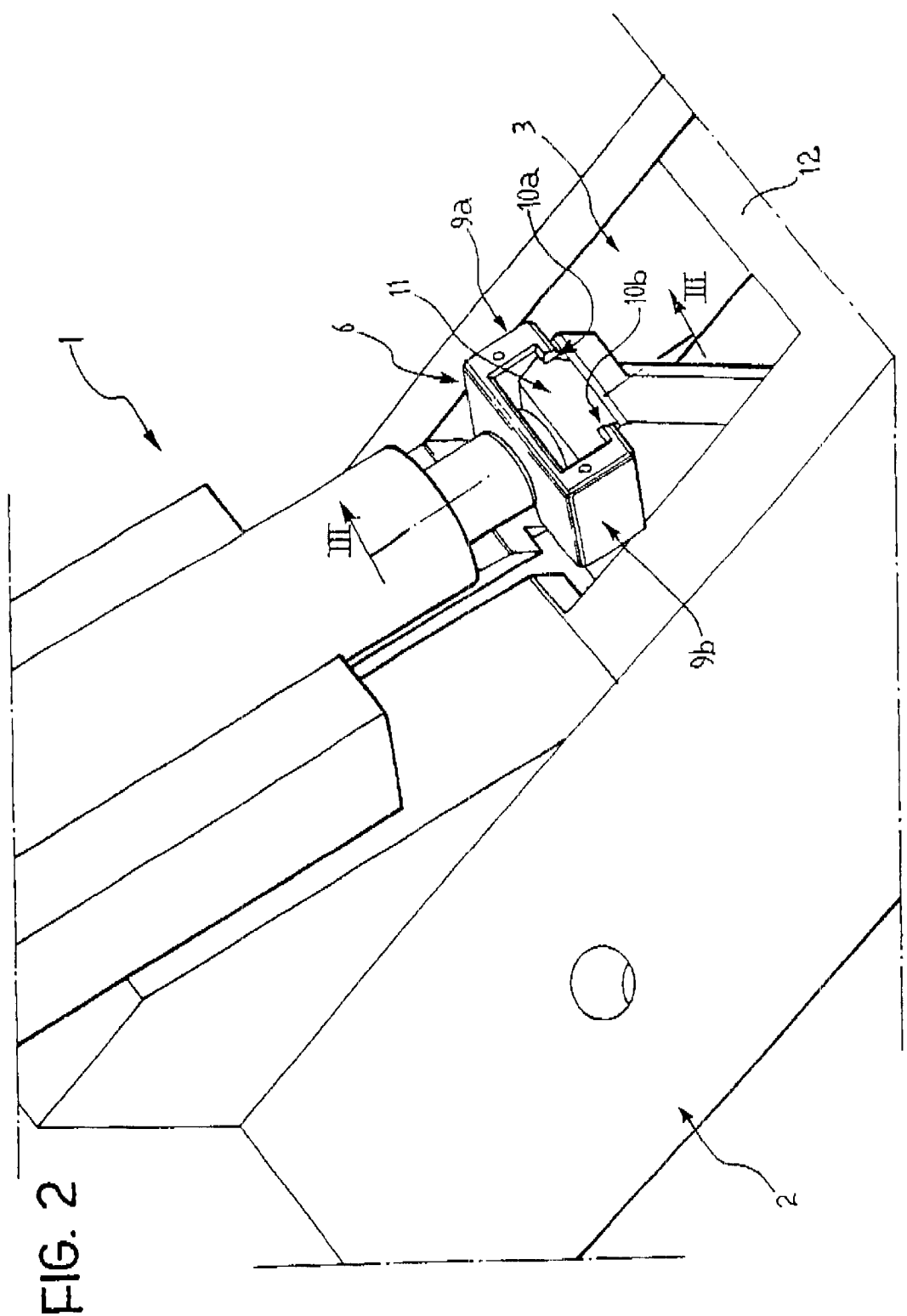
FIG. 2 illustrates a detail from a different view showing the end of the auxiliary unit interconnected to the main mould.
Figure 3:
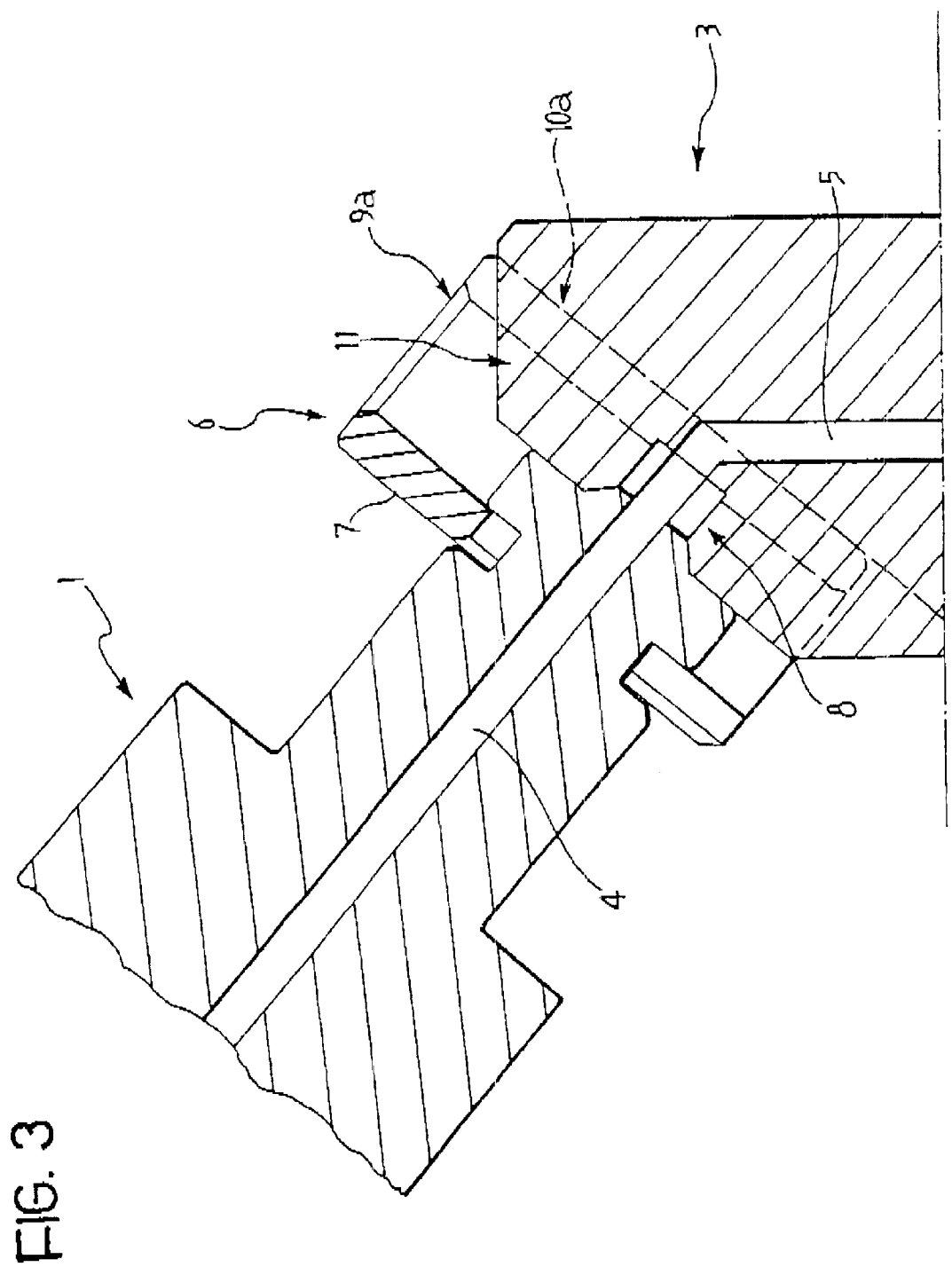
FIG. 3 is a view taken on the section line III—III of FIG. 2.

With reference to the above-indicated figures, the reference numeral 1 indicates an auxiliary injection unit and the reference numeral 2 indicates a mould in one side of which there is at least one connection 3 for allowing the introduction of a component from the auxiliary unit into the mould itself.

This latter further has known channels and devices such as slides or others, able to allow the production, in successive stages, of products or articles of plastics material having at least two components.

Similarly the auxiliary unit 1 has suitable first channels 4 for the introduction of the component into the mould 2, which first channels can be put into communication with second channels 5 formed in the connection 3.

At one end of the auxiliary unit 1 there is a plate 6 of essentially C-shape, the base 7 of which is fixed to the said end close to the nozzle 8 of the auxiliary unit 1.

The plate 6 has a pair of identical lugs 9a, 9b which are slidably engageable in correspondingly shaped guides 10a, 10b formed on a slide 11 present on the connection 3.

The length and shape of the lugs 9a, 9b is such as to allow an interconnection between the plate 6 and the slide 11 such as to bring the first channels 4 of the auxiliary unit 1 into register with the second channels 5 present on the connection 3, thus allowing, when the auxiliary unit is fitted, the component to flow into the mould 2.

Advantageously the slide 11 is inclined with respect to a flat surface 12 of the mould 2 such as to allow an inclined arrangement of the auxiliary unit 1.

It has thus been established that the invention achieves the purposes and objects previously listed, it being devised as an auxiliary injection unit which can be fitted in a very rapid and easy manner to the connection formed on the mould by means of a simple sliding insertion of the plate 6 onto the slide 11.

The coupling and uncoupling of the auxiliary unit to and from the mould is therefore easily achieved quickly and in very easy manner without special tools and without requiring the personnel to have a particular skill.

The modification of the auxiliary units of known type is moreover very simple and presents very low operating costs both for the application of the plate and for the arrangement of the slide, this allowing known installations to be modified at low cost.

Naturally, the invention is susceptible to numerous modifications and variations all lying within the scope of the same inventive concept.

Naturally also the materials as well as the dimensions of the individual components of the unit could be the most appropriate according to the specific requirements.

What is claimed is:

1. An auxiliary injection unit for fitting to one side of a mould (2) for forming articles of plastic material, and including at least one connection (3) attached to said one side of said mould for allowing the injection of a further plastic material component, characterised in that the said unit (1) has at one end, a nozzle (8) for the introduction of said further plastic material (1) and plate (6) fitted slidably to a slide (11) associated with the said at least one connection (3) to secure the nozzle to at least one connection.

2. An auxiliary unit as claimed in claim 1, characterised in that said plate is (1) C-shaped (6) the base (7) of which is located close to the nozzle (8) for the introduction of said further plastic material.

3. A unit as claimed in claim 2, characterised tin that the said plate (6) has a pair of identical lugs (9a, 9b), which is fitted slidably to correspondingly shaped guides (10a, 10b) formed in said slide (11) present on tie said connection (3).

4. A unit as claimed in claim 3, characterised in that the shape and length of said lugs (9a, 9b) allow an interconnection between the said plate (6) a slide (11) in order to bring a first channel (4) of the said auxiliary unit (1) into register with a second channel (5) on the said connection (3).

5. A unit as claimed in claim 1, characterised in that the said slide (11) is inclined with respect to a flat surface (12) of the said mould (2) so as to allow the arrangement of the said auxiliary unit (1) in an inclined plane.

6. A unit as claimed in claim 1, characterised in that said plate (6) is slidably fittable on the slide (11) in a direction which is perpendicular to the direction of extension of the channel (4) of the nozzle (8) of the unit (1).

* * * * *

UNITED STATES PATENT AND TRADEMARK OFFICE
CERTIFICATE OF CORRECTION

PATENT NO. : 6,450,794 B1
DATED : September 17, 2002
INVENTOR(S) : Enrico G. Orru It is certified that error appears in the above-identified patent and that said Letters Patent is hereby corrected as shown below:

Title page,
Item [22], PCT Filed, "Mar. 16, 2001" should be -- Mar. 23, 1999 --

Signed and Sealed this

Twenty-fifth Day of January, 2005

JON W. DUDAS
*Director of the United States Patent and Trademark Office*